E. SEPULCHRE.
APPARATUS FOR EXTRACTING AND REFINING GREASY SUBSTANCES CONTAINED IN WATER.
APPLICATION FILED SEPT. 14, 1917.

1,396,889.

Patented Nov. 15, 1921.
3 SHEETS—SHEET 1.

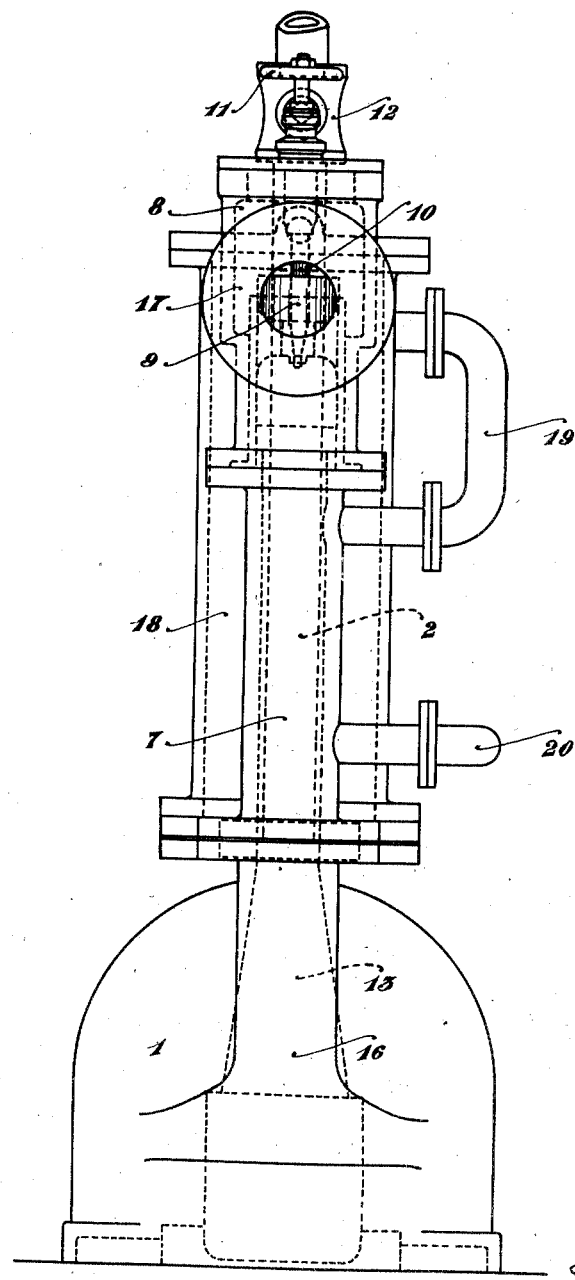

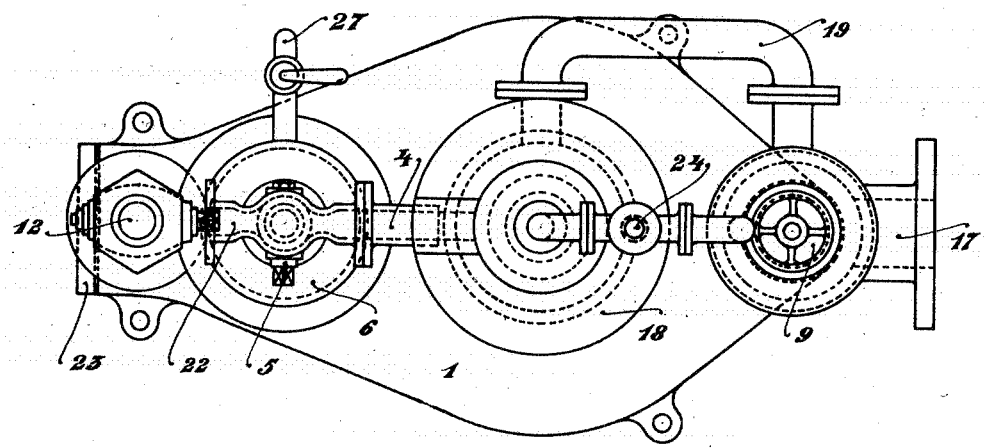
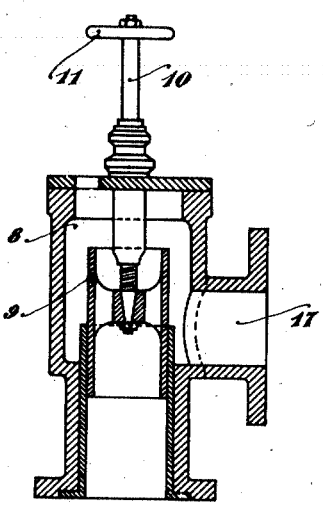
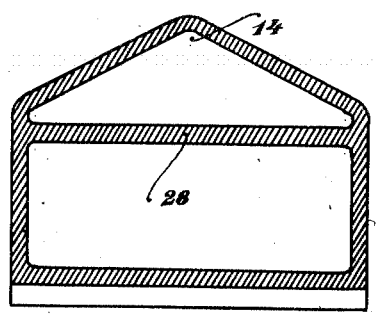
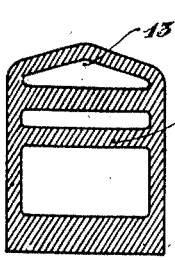

UNITED STATES PATENT OFFICE.

EDOUARD SEPULCHRE, OF WOLUWE-ST. PIERRE, BELGIUM.

APPARATUS FOR EXTRACTING AND REFINING GREASY SUBSTANCES CONTAINED IN WATER.

1,396,889.      Specification of Letters Patent.      Patented Nov. 15, 1921.

Application filed September 14, 1917. Serial No. 191,493.

*To all whom it may concern:*

Be it known that I, EDOUARD SEPULCHRE, subject of the King of Belgium, residing at Woluwe-St. Pierre, Belgium, have invented certain new and useful Improvements in Apparatus for Extracting and Refining the Greasy Substances Contained in Water, (for which I have filed application in Belgium January 31, 1916;) and I do hereby declare the following to be a full, clear, and exact description of the invention.

The object of this invention is to realize, by means of an apparatus operating automatically and without interruption, the recovery and refining of oils and greasy substances contained in condensed water, waste water from factories, etc.

For this purpose it is necessary to consider the various states in which these greasy substances are to be found:

First, as oil drops, bubbles, small grumes or small pieces of greasy substances in a solid or butyrous state;

Second, as very small drops of liquid or particles inclosed in a water-cover, that may be very close together, without being actually in contact, which would cause them to agglomerate;

Third, as emulsioned substances within the water itself. In this case they have the appearance of cream or cloudy, greasy bodies in the liquid mass.

Water which contains a great proportion of grease in one or all the various states above-specified, invariably will have a density which is smaller in proportion to the increase of the quantity of greasy substances that it contains. Consequently this greasy water, being lighter, will rise to the upper part of the receptacle containing the mixture. On the other hand, the greasy substances generally attract very tiny filthy matter which, although being rather heavy by nature, may remain suspended in the liquid by reason of the greasy substances that surround it.

Moreover, every oil drop surrounded by water, gets covered with a greasy pellicle, the fluidity of which is less than that of the oil itself and which for this reason may keep with it rather heavy solid extraneous dust.

In the case of recovery of oil in condensing water from steam-engines, the greasy substances supplied directly by the exhaust cock of a steam cylinder, are to a great extent and sometimes completely emulsioned by the down and upstroke of the piston and they then appear in the water as flakes or butyrous particles which may sometimes contain metallic dust arising from the wear of the engine.

The emulsioned particles are disaggregated or broken up into their oil and water constituents more readily if maintained in a warm condition, the drops of oil rising through the thick mixture. It is preferable to effect such separation within a heated, vertically extending pipe or container of relatively small diameter, the movements of the particles under the action of heat being assisted by the height of such container.

The object of this invention is attained especially by means of an apparatus which has at its base a separating pot of convenient shape carrying the oil and the greasy substances to a column, wherein by the slow action of heat the thickened and emulsioned greasy substances again dissolve and disaggregate into oil and water; as the oil, while refining, ascends to its outlet orifice, the extraneous substances descend and the separated water joins the bulk of water deprived of its oil in the separating pot, where an outlet is provided for it near the bottom admitting it into its cleansing column.

Figure 1 represents a vertical length section of the apparatus;

Fig. 2 an elevation of the apparatus seen from the side where the water flows out, that is from the right of Fig. 1;

Fig. 3 represents a top plan view of Fig. 1;

Fig. 4 is a section on line AA of Fig. 1, especially the section of the pipe feeding the mixture;

Fig. 5 is a section on line BB of Fig. 1 showing the triangular shape of the conduit for the mixture into the separating pot;

Fig. 6 is a partial section of the water-outlet showing the cylindrical dam regulating the water level in its special position different from Fig. 1 for completely removing the oil.

Figure 1:
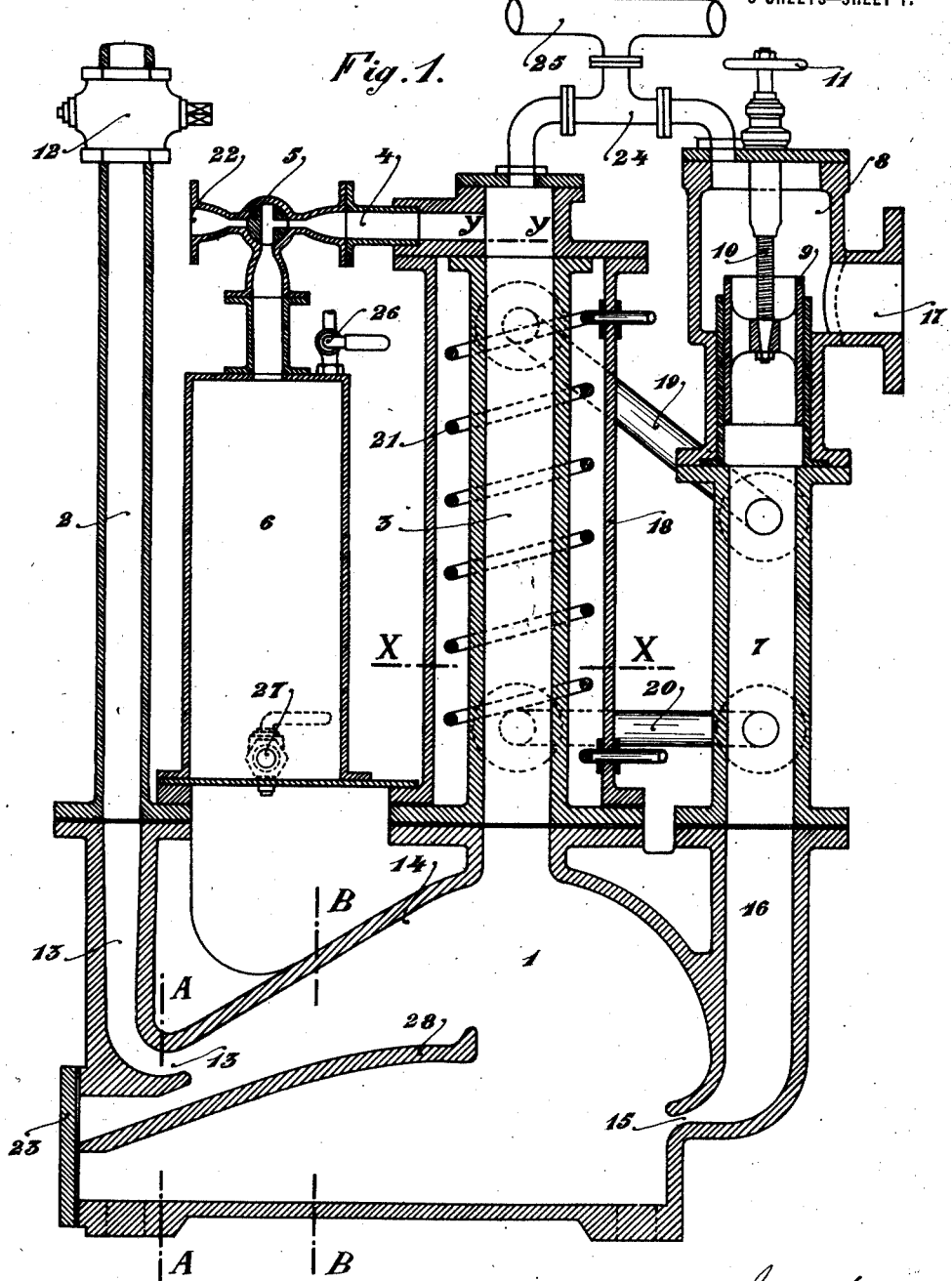

The apparatus is composed essentially of a separating pot 1, operating uninterruptedly. It is charged with the mixture through column 2 and while the light liquid, viz the liquid containing greasy substances, goes to column 3 from where it is removed by outlet pipe 4 and the threeway cock 5 bringing the oil to a receptacle 6, the water or heavy liquid is separated into column 7 and bearing piece 8 and then carried away through tube 17. Inside the bearing piece 8 is provided a slidable cylindrical dam 9, the height of which is regulated by a screw 10 driven by a hand wheel 11.

The vertical tube or column 2, the section of which is relatively small and provided with a cock 12, is used for bringing the mixture of water and oil into the body of the separating pot. It is fastened by means of bolts on tube 13, the section of which is flattened or triangular, as shown in Fig. 4, so as to supply the mixture into the apparatus through a spout of a relatively small height. The mixture meeting partition 28 proceeds into the apparatus through passage 14 which preferably has a triangular or roof-shaped cross section (Fig. 5) increasing in the direction of flow.

The rapidity of flow of the mixture in this passage, in ascending direction, will diminish gradually and, as the section is offering to the heavy liquid a free passage increasing downward it will progress more and more slowly, while the oil bubbles possessing a certain lifting strength, are assisted thereby in their ascending progression gliding along the upper roof-shaped part of passage 14 and ultimately arriving under oil-column 3.

The water or heavy liquid flows out of the separating pot through orifice 15 of small height and great width and proceeds up through tube 16 into column 7 and bearing piece 8, whence it flows out through tube 17. The level of the cylindrical dam 9 has to be regulated in such a manner that the height of the column of water be such as to obtain in column 3 a level-difference XX—YY between the surface of contact of the oil with the mixture and the bottom of outlet pipe 4 which difference will be sufficient to insure that the oil and the greasy substances remain in column 3 long enough for attaining the required degree of refinement and clarification.

The most suitable position of the dam established by calculation or experience is indicated on the outside by a mark on the handwheel 11 or indicated in any other convenient way.

In the example given, column 3 is surrounded by a double water-jacket 18 of which the upper and the lower parts may be connected with column 7 by means of pipes 19 and 20 at convenient levels.

A circulation similar to that of the termosiphons may thus take place in the double water-jacket at the temperature of the mixture. Generally, the mixture of liquids supplied to the apparatus has a relatively high temperature. This hot liquid rising in column 7 is caused to circulate through pipe 19, water jacket 18 and pipe 20 to heat column 3 containing the oil. In the case however where the temperature of water is not sufficient, additional heat may be supplied, by means of a coil 21. The pipe 20 provides also means by which, when the water is drawn from the apparatus, practically all of the cooled water within the jacket 18 may escape. In case the water in jacket 18 becomes too highly heated the pipe 19 affords a means for conducting away steam that may form in the jacket.

The cylindrical dam 9 is also designed to coöperate in the separation of the oil and the cleansing of the apparatus. Because when the dam is raised the difference between the level of the oil and the water is diminished and the oil is forced upward, which tends to its separation. Consequently, if the dam is raised to a certain level, a quantity of oil flows out and the oil may thus eventually be gathered successively in more and more refined and purified form.

When only a last layer of greasy matter, full of foreign substances remains in column 3, the connection with receptacle 6 is closed, by means of the threeway cock 5, and the connection with the outside is established through tube 22. Then the dam 9 is raised to a level above the upper side of the outlet-pipe 4 in order to drive out the waste oils and water collected at the bottom. This operation can only take place after stopping, as the apparatus is then at atmospheric pressure.

With reference to the heaviest extraneous substances which would not rise up to the level of contact XX between oil and water and which substances have fallen down to the bottom of the separating pot 1, they may now be removed through the cleaning aperture 23 by means of a scraper.

The above described apparatus may operate at atmospheric pressure or at a pressure different from the atmospheric. The first case does not need any further explanation, it will be sufficient to state that the spaces which are not filled up with liquid be put in contact with atmospheric air. In the second case, the apparatus is connected, through pipe 2, with the bottom of a steam drying-apparatus or other device that feeds it with the mixture of liquid at a pressure other than atmospheric pressure.

The water deprived of its oil is preferably removed from the apparatus through tube 17 by means of a pump. In order to obtain the proper levels of liquid in columns 3 and 7 in the apparatus as well as in the piping a connecting pipe 24 is provided, branching off into another pipe 25, of larger diameter, which connects the device supplying the mixture to column 2 with the receptacle into which flows the water deprived of its oil through tube 17. When the apparatus is operating at full capacity, it is possible to remove the oil gathered in receptacle 6 for which purpose it will only be necessary to close cock 5 to let in air through cock 26 and to take the oil out through cock 27.

The apparatus represented here may be operated intermittently. It is, however, especially designed for operating uninterruptedly. It may namely be charged with mixture without interruption, so that refined oil and water flow out continually through their respective outlets; it works then automatically and without stopping, there being no strainers to clean, and because the oil which is naturally thick remains in liquid condition under the action of the heat.

When the apparatus is used for recovering and refining oils or condensing water, the proportion of oil gathered is very small as compared with the quantity of water the oil brought automatically to outlet pipe 4, remains thus many hours in its column and as it undergoes an uninterrupted decantation at high temperature, it will consequently be free from water and all the earthy or metallic substances which are prejudicial to the oiling of machines.

The use of the same apparatus may also be effective even at ordinary temperature with slightly viscous oils, for separating heavy dust from the oils because the separation of the latter, whether automatical or not always takes place through decanting, that is, without disturbing the natural classification in the refining column.

I claim:

1. An apparatus for separating liquids of different specific gravities comprising a receptacle provided with an inlet, for a mixture of the liquids to be separated, and two outlets situated in different horizontal planes, two vertically extending tubular receivers communicating at their lower ends with said outlets, the receiver for the lighter liquid extending from the higher outlet and to a greater elevation than the other receiver, and means for heating the receiver for the lighter liquid.

2. An apparatus for separating liquids of different specific gravities comprising a receptacle provided with an inlet, for a mixture of the liquids to be separated, and two outlets, one in its top and one in a side wall, two vertically extending tubular receivers communicating, respectively, with said outlets, each of said receivers having a suitable outlet, the outlet from the receiver that communicates with the top of the receptacle being at a higher elevation than that from the other receiver, and means for heating the receiver for the lighter liquid that communicates with the outlet in the top of the receptacle.

3. An apparatus for separating liquids of different specific gravities, comprising a receptacle provided with an inlet for a mixture of the liquids to be separated, and two outlets situated in different horizontal planes, two vertically extending tubular receivers communicating, respectively, with said outlets, each of said receivers having a suitable outlet, the outlet from the receiver that communicates with the higher outlet from the receptacle being in a plane above that from the other receiver, a cylinder surrounding and spaced from the receiver for the lighter liquid that communicates with the higher outlet of the receptacle, and pipes, as 19, 20, connecting the space between said cylinder and inclosed receiver with the other receiver for causing a circulation of liquid therein.

4. An apparatus for separating liquids of different specific gravities, comprising a receptacle provided with an inlet for a mixture of the liquids to be separated, and two outlets situated in different horizontal planes, two vertically extending tubular receivers communicating, respectively, with said outlets, each of said receivers having a suitable outlet, the outlet from the receiver that communicates with the higher outlet from the receptacle being in a plane above that from the other receiver, a cylinder surrounding and spaced from the receiver for the lighter liquid that communicates with the higher outlet of the receptacle, and a heating coil within the space inclosed by said cylinder.

5. In an apparatus for the purpose described the combination of a receptacle having an inlet and two outlets located respectively in the top and a side wall, the top of the receptacle being inclined upwardly from the inlet to the outlet in the top and inclined transversely in opposite directions downward from a line connecting said inlet and outlet, a partition within the receptacle extending into the path of liquid entering the inlet and forming the bottom of a passage adapted to guide the lighter liquid to the outlet in the top of the receptacle, two tubular receivers extending vertically from the outlets of the receptacle, and means for heating the receiver that communicates with the outlet in the top of the receptacle.

In testimony whereof I affix my signature in presence of two witnesses.

EDOUARD SEPULCHRE.

Witnesses:
PAUL RIGO,
F. BALAND.